(12) United States Patent
Gabrielson

(10) Patent No.: US 11,194,566 B1
(45) Date of Patent: Dec. 7, 2021

(54) DECENTRALIZED, CLUSTER-MANAGED DEPLOYMENT OF SOFTWARE UPDATES IN A MULTI-CLUSTER ENVIRONMENT

(71) Applicant: Amazon Technologies, Inc., Seattle, WA (US)

(72) Inventor: Jacob Adam Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/820,223

(22) Filed: Mar. 16, 2020

(51) Int. Cl.
| | |
|---|---|
| *G06F 8/65* | (2018.01) |
| *G06F 9/455* | (2018.01) |
| *G06F 11/36* | (2006.01) |
| *H04L 29/08* | (2006.01) |
| *H04L 29/06* | (2006.01) |

(52) U.S. Cl.
CPC ............ *G06F 8/65* (2013.01); *G06F 9/45558* (2013.01); *G06F 11/3688* (2013.01); *G06F 11/3692* (2013.01); *H04L 67/10* (2013.01); *H04L 67/34* (2013.01); *G06F 2009/45595* (2013.01); *H04L 67/42* (2013.01)

(58) Field of Classification Search
CPC .... G06F 8/65; G06F 9/45558; G06F 11/3692; G06F 11/3688; G06F 2009/45595; H04L 67/34; H04L 67/10; H04L 67/42
See application file for complete search history.

(56) References Cited

U.S. PATENT DOCUMENTS

| | | | |
|---|---|---|---|
| 9,842,017 B1 | 12/2017 | Zhang et al. | |
| 2015/0378716 A1* | 12/2015 | Singh | H04W 4/60 717/172 |
| 2017/0364345 A1* | 12/2017 | Fontoura | G06F 9/5072 |
| 2018/0336027 A1* | 11/2018 | Narayanan | G06F 8/60 |
| 2018/0349130 A1* | 12/2018 | Mohammed | H04L 67/322 |
| 2019/0349428 A1* | 11/2019 | Kovacheva | H04L 67/1095 |

\* cited by examiner

*Primary Examiner* — Daxin Wu
(74) *Attorney, Agent, or Firm* — Knobbe Martens Olson & Bear, LLP

(57) ABSTRACT

Generally described, one or more aspects of the present application relate to deploying a software update to multiple clusters in a decentralized manner, where the individual clusters manage their own deployments based on successes and/or failures experienced by other clusters that have installed the software update. For example, a set of least conservative clusters may install the software update right away, whereas a set of more conservative clusters may wait and see how many of the clusters have installed the update so far and/or how the update is performing on those clusters, before installing the update themselves.

20 Claims, 7 Drawing Sheets

US 11,194,566 B1

DECENTRALIZED, CLUSTER-MANAGED DEPLOYMENT OF SOFTWARE UPDATES IN A MULTI-CLUSTER ENVIRONMENT

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
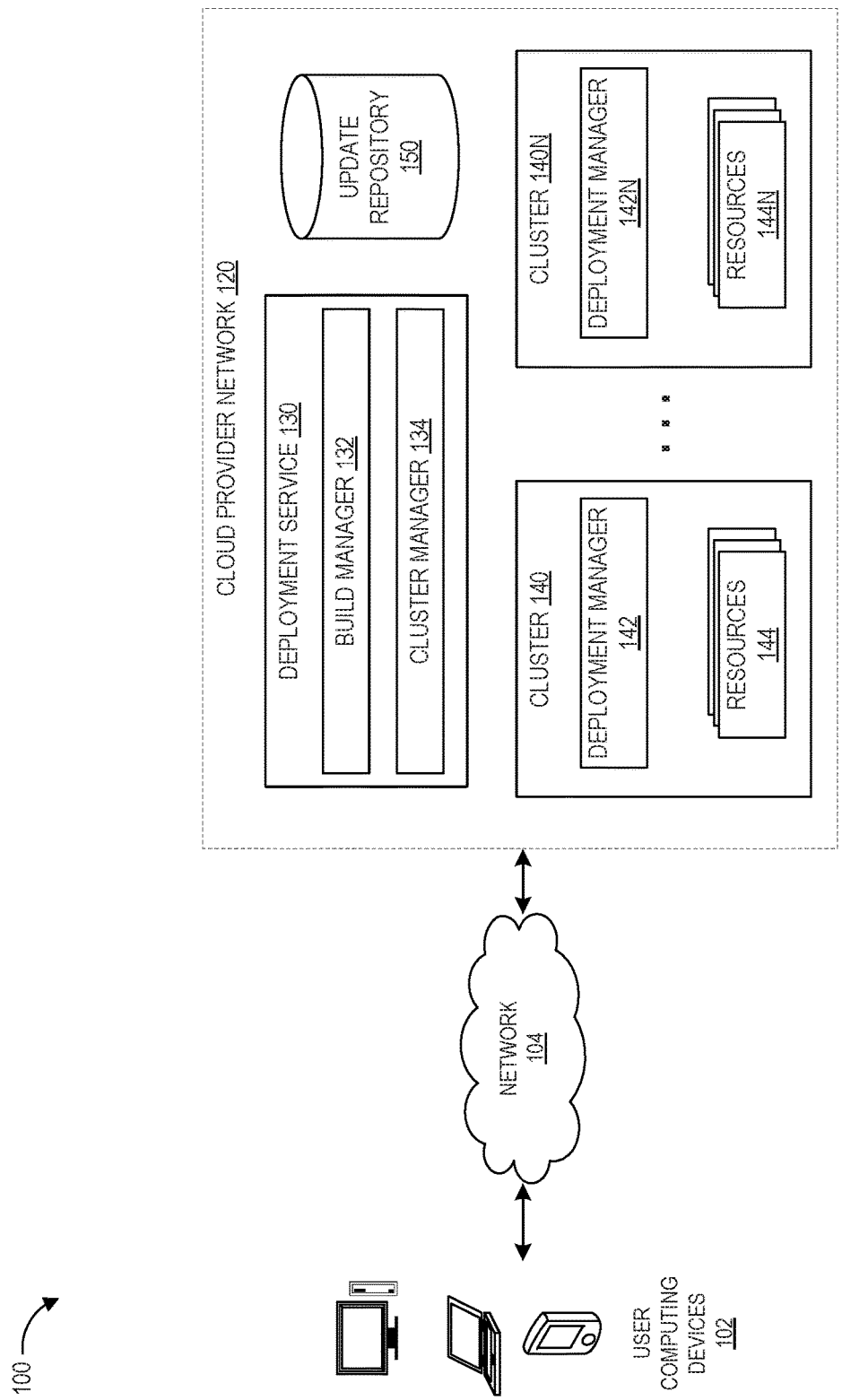
FIG. 1 depicts a schematic diagram of a network environment in which a cloud provider network is used to implement a deployment service in accordance with aspects of the present disclosure.

Many software applications can run using one or more computing "clusters," which can include at least one cluster master (which runs control processes including scheduling, resource control, handling API requests, and deciding what runs on the cluster's nodes) and multiple nodes (which are the worker machines that run containerized applications and other workloads). These clusters can run across a number of physical machines in a distributed computing environment such as a cloud provider network. In automated continuous integration and continuous delivery (CI/CD) models, a build and continuous integration system has authority to push any change to any cluster (or server). However, there is an increasing trend towards clusters managing their own deployments, for example in the GitOps model, a framework in which changes and updates to a production environment happen through changes to its code repositories, and which allows users to specify processes around how production environments are synced when there are changes to the code repositories. In this model, the cluster does its own deployments, based on observing a repository (potentially Git-based) containing the latest configuration. If the cluster trusts that configuration, it will import it and begin to enact whatever changes the latest configuration implies. Particularly in workloads based on complicated service graphs, deployments become increasingly complicated. For example, a single service may be composed of tens or even hundreds of clusters, some of which may be replicated across cloud availability zones or regions. One problem that is experienced at high scale is that a deployment may not actually be safe, yet the problems that the deployment causes do not get noticed fast enough and spread across more of the system than is desired. In the cluster-based model, ideally at most one cluster would receive a bad deployment before it was rolled back.

The aforementioned challenges, among others, are addressed in some embodiments by the disclosed techniques for deploying a software update to multiple clusters in a decentralized manner, where the individual clusters manage their own deployments based on successes and/or failures experienced by other clusters that have installed the software update. For example, a set of least conservative clusters may install the software update right away, whereas a set of more conservative clusters may wait and see how many of the clusters have installed the update so far and/or how the update is performing on those clusters, before installing the update themselves. In some examples, the term "cluster" may refer to a group of servers, virtual machines, physical machines, containers, or other forms of virtual or physical compute units that are configured to execute the same application to distribute the load and to improve availability and performance. Such compute units or resources may be temporarily assigned to a user (e.g., for the duration of executing an application or program code thereon), or permanently assigned to the user (e.g., assigned to the user even after the execution of the application or program code has been completed).

In some implementations, software updates are pushed out to the clusters by a centralized deployment server. However, in such implementations, if the centralized deployment server makes an erroneous judgment and pushes out a faulty software update, all of the clusters managed by the centralized deployment server would be affected, providing a single point of failure. For example, by the time an error in the software update that requires a rollback (e.g., returning the application to a state prior to the installation of the update) is discovered, many or all of the clusters may have already installed the software update and suffered the consequences of the faulty update (e.g., crashes, errors, loss of sales, high latencies, etc.). Further, in such implementations, the centralized deployment server may need to communicate with all of the individual clusters, thereby generating a lot of network traffic to and from the centralized deployment server, which may be problematic if the number of clusters is large. Thus, an improved method of deploying software updates to clusters in a decentralized manner is desired.

The presently disclosed technology addresses these deficiencies by allowing the individual clusters, rather than a centralized deployment server, to manage the deployment of software updates to the individual clusters. For example, a deployment server may build and/or test a particular software update and store the software update in an update repository for download by the clusters, but may not take any further actions to facilitate the deployment of the software update onto the clusters. Instead, the clusters may access the software update from the update repository and choose to apply the software update whenever they choose. By giving the individual clusters some autonomy around whether and when to apply a given software update that has been made available, the presently disclosed technology reduces the burden on the deployment server, thereby reducing the overall network traffic to and from the deployment server and also reducing the vulnerability of the deployment central server as a single point of failure.

As will be appreciated by one of skill in the art in light of the present disclosure, the embodiments disclosed herein improve the ability of computing systems, such as deployment systems, to provide mechanisms for reducing the burden on the deployment server and providing more autonomy to the individual clusters within a cloud provider network so that the risk of applying a faulty software update to too many clusters before the error is discovered can be reduced. By allowing the individual clusters to decide whether and when to deploy a software update that has been made available by the deployment server and providing multiple groups of clusters having different levels of "conservativeness" (e.g., how trusting a cluster is of a given update or of a fellow cluster), the cloud provider network of the present disclosure can address the deficiencies described above.

Prior techniques generally relied on a centralized deployment server determining when a software update should be deployed to each cluster. However, such approaches allow the mistakes made by the centralized deployment server to affect all of the clusters managed by the centralized deployment server. In contrast, embodiments of the present disclosure enable the individual clusters to determine, based on their own criteria and thresholds, whether and when to apply a software update that has been made available for an application running on the cluster, thereby reducing the risk of an erroneous decision made by the deployment server affecting all of the clusters managed by the deployment server.

The presently disclosed embodiments therefore address technical problems inherent within computing systems, such as the vulnerability of a centralized server that manages a large number of components within the network. These technical problems are addressed by the various technical solutions described herein, including allowing the individual clusters to communicate with one or more other components of the cloud provider network to gather information about the software update and to decide whether and when to apply the software update. Thus, the present disclosure represents an improvement on existing software deployment systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Deployment Service and Clusters

FIG. 1 depicts an example computing environment 100 including a cloud provider network 120 in which the disclosed deployment service and clusters can be implemented. A cloud provider network (sometimes referred to as a cloud provider system or simply a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed cluster-managed deployment techniques may be implemented in non-elastic computing environments as well.

The cloud provider network 120 can be accessed by user computing devices 102 over a network 104. The cloud provider network 120 may include a deployment service 130, clusters 140 through 140N, and an update repository 150 that are in networked communication with one another and with the network 104 to provide users with on-demand access to the services and resources provided by the cloud provider network 120. As shown in FIG. 1, the clusters 140-140N include deployment managers 142-142N and resources 144-144N. Some implementations of cloud provider network 120 can additionally include compute servers, block store servers, object storage servers, domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The deployment service 130 may provide a set of application programming interfaces ("APIs") that can be used by the users of the user computing devices 102 to upload software updates to one or more applications running on the clusters 140-140N. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

In the example of FIG. 1, the deployment service 130 includes a build manager 132 and a cluster manager 134. The build manager 132 may build and/or test a particular software update provided by the user computing device 102 and store the software update in the update repository for download by the clusters 140-140N. The cluster manager 134 may keep track of the clusters 140-140N and receive information about the deployments (e.g., whether or not a software update has been deployed, how the updated applications are performing, etc.) from the clusters 140-140N. Based on such received information, the cluster manager 134 may cause one or more conditions or thresholds used for deployment to be changed (e.g., if the users of the clusters are reporting too many errors, make the deployment threshold more conservative, if not enough deployments are happening, make the deployment threshold less conservative, etc.). In some cases, such adjustments can be determined and/or performed by the individual clusters. The deployment manager 142 may determine, based on information made available to the cluster 140 (e.g., from other clusters, from the deployment service 130, or from the one or more repositories described herein), whether and when to deploy an update onto the resources 144 of the cluster 140. The operations of the deployment service 130 and the clusters 140-140N are described in greater detail below with reference to FIGS. 2-5.

The resources 144 may include one or more of physical machines, virtual machines, containers, nodes, or other forms of virtual or physical compute units that are configured to execute one or more applications to which the updates described herein can be applied. For example, the cloud provider network 120 may offer virtual compute instances (also referred to as virtual machines, or simply "instances") with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

The cloud provider network 120 can provide on-demand, scalable computing platforms to users through the network 104, for example allowing users to have at their disposal scalable "virtual computing devices" via their use of the clusters 140-140N and the resources 144-144N. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The resources 144 (also referred to herein as compute resources or compute instances) can have various configurations of processing power, memory, storage, and networking capacity depending upon user needs. The resources 144 may also provide computer storage for temporary data used while, for example, a container instance is running, however as soon as the container instance is shut down this data is lost. In one embodiment, each of the compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability. The clusters described herein may be implemented within the same region or available zone or across multiple regions or available zones.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network may implement various computing resources or services, which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts. The disclosed deployment service can be implemented as part of a virtual compute service, container service, or Kubernetes-based container service in some embodiments.

Example Configurations of Deployment Service and Clusters

Figure 2:
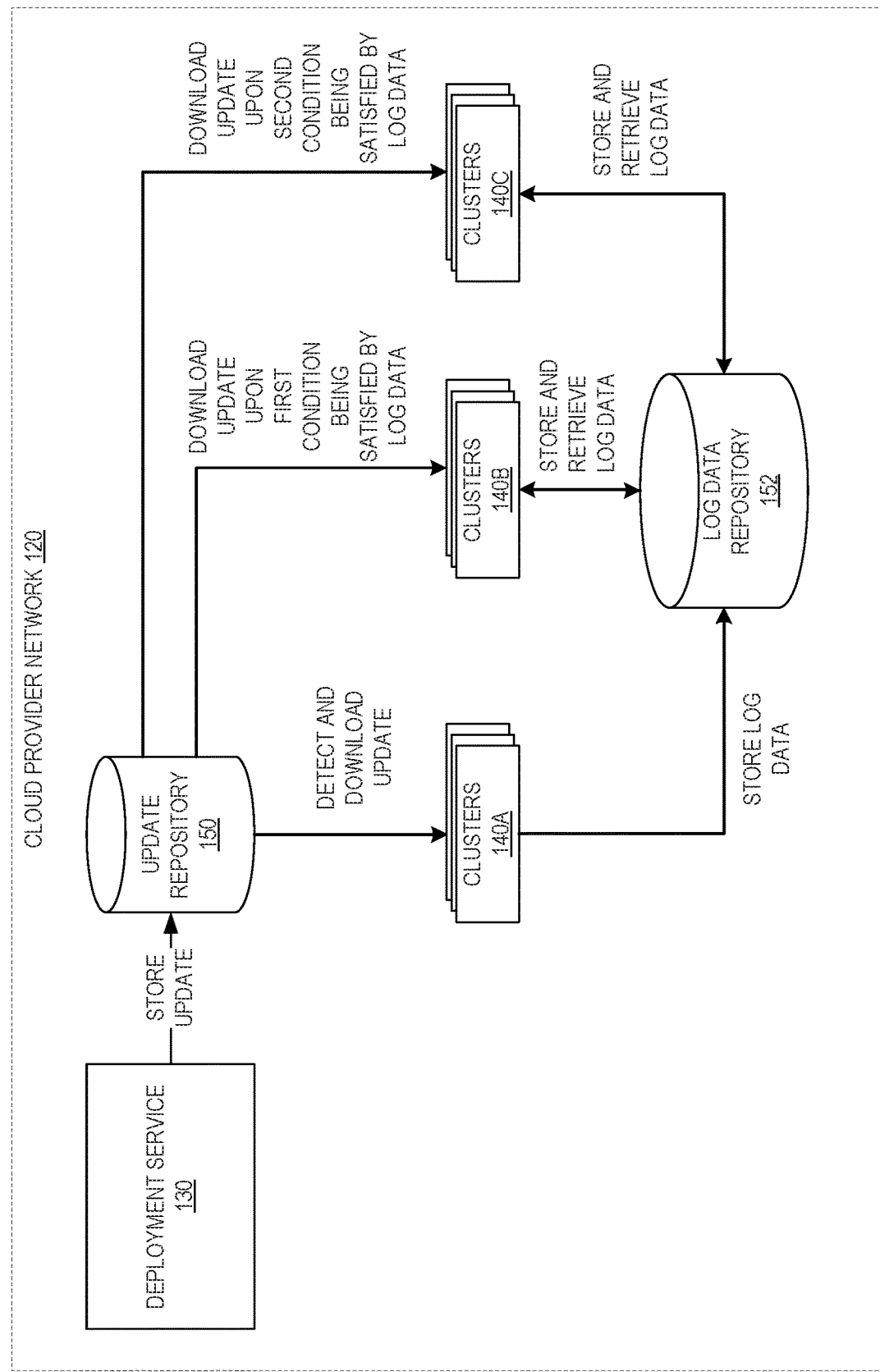
FIG. 2 depicts a block diagram of an embodiment in which a software update is deployed to multiple clusters in accordance with aspects of the present disclosure.
Figure 3:
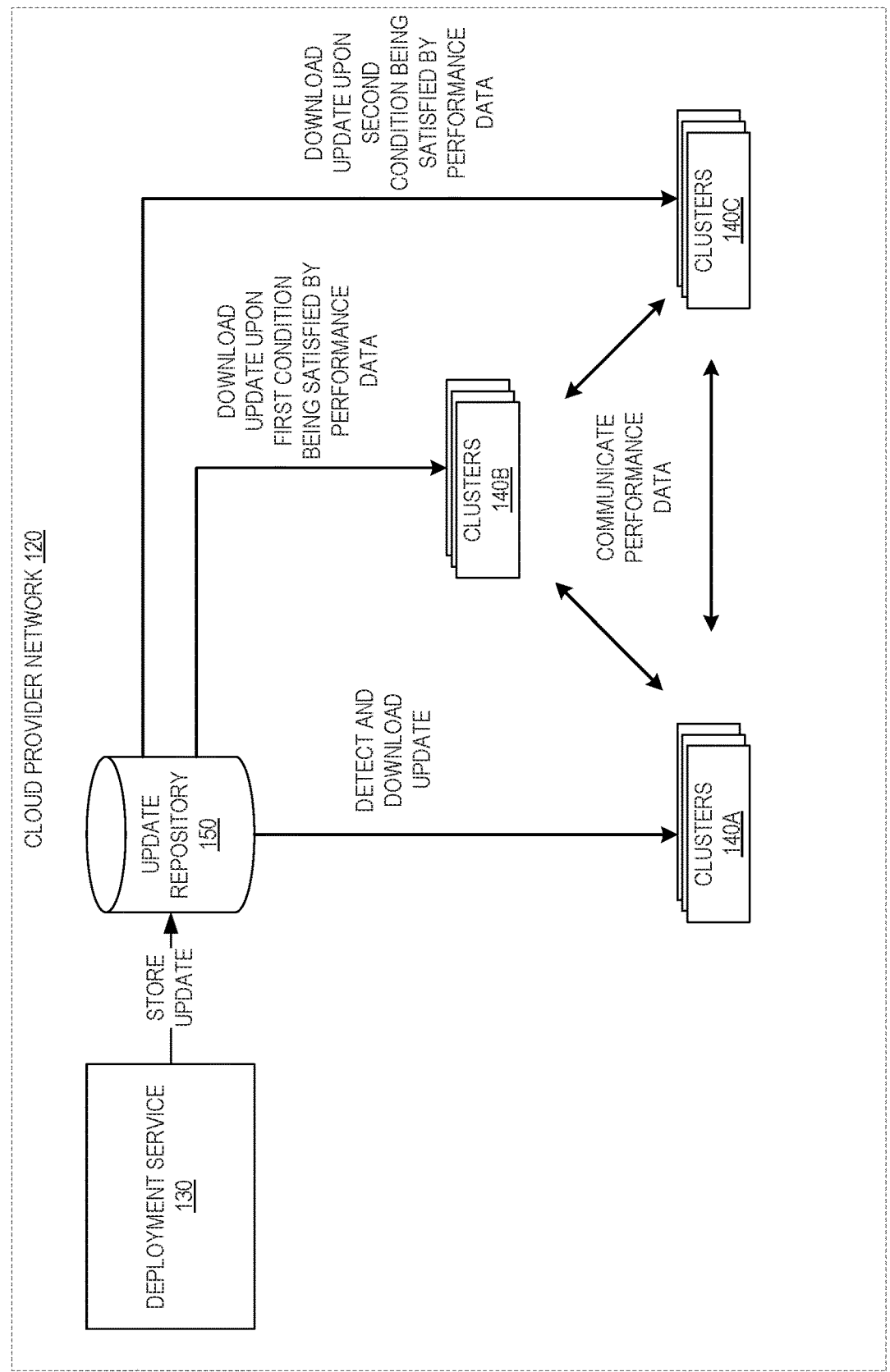
FIG. 3 depicts a block diagram of another embodiment in which a software update is deployed to multiple clusters in accordance with aspects of the present disclosure.
Figure 4:
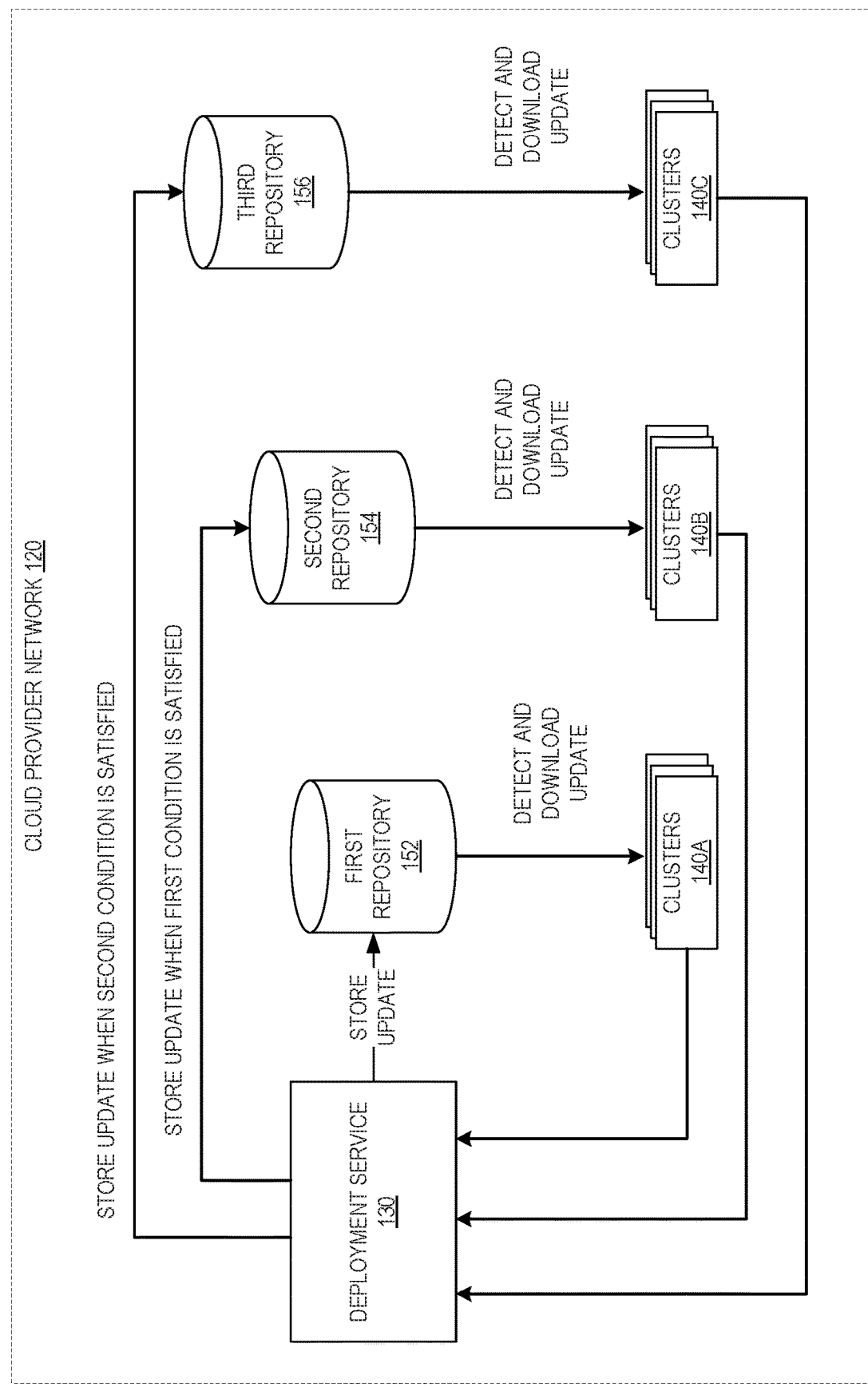
FIG. 4 depicts a block diagram of another embodiment in which a software update is deployed to multiple clusters in accordance with aspects of the present disclosure.

FIGS. 2-4 depict example configurations of the deployment service and the clusters within the cloud provider network 120. More specifically, FIG. 2 depicts a block diagram of an embodiment in which the clusters decide whether and when to deploy a software update based on log data generated and stored by other clusters onto a repository, FIG. 3 depicts a block diagram of an embodiment in which the clusters decide whether and when to deploy a software update based on performance data communicated to and from other clusters, and FIG. 4 depicts a block diagram of an embodiment in which the deployment service stores the update data onto different repositories (or different sections of a repository) based on the different conditions required by the different groups of clusters having a varying degree of conservativeness for deploying the update. The conditions for deploying the update described herein may be specified by the user computing device 102 (e.g., by the administrator or user of the clusters) or another component in the cloud provider network 120 (e.g., by the deployment service 130 to ensure that the various clusters behave differently and have different thresholds for deploying the update). The conditions may be adjusted by the deployment service 130 or the individual clusters 140-140N to improve the deployment process (e.g., to expedite deployment while keeping the error rates below a threshold).

In the example of FIG. 2, the cloud provider network 120 includes the deployment service 130 that stores a software update (e.g., the data usable to update an application running on the clusters) onto the update repository 150. FIG. 2 also illustrates three groups of clusters: clusters 140A, clusters 140B, and clusters 140C. Each of these groups may have a different condition/threshold for applying the update stored in the update repository 150. For example, the clusters 140A (also individually referred to herein as cluster 140A) may apply the update as soon as the update is made available, the clusters 140B (also individually referred to herein as cluster 140B) may apply the update when a first condition is satisfied, the clusters 140C (also individually referred to herein as cluster 140C) may apply the update when a second condition is satisfied, where the second condition may be stricter than the first condition as described herein. In such an example, the cluster 140A (e.g., one of the clusters 140A) may detect the software update stored onto the update repository 150 by the deployment service 103 and download the software update. After the application running on the cluster 140A is updated, the cluster 140A outputs log data to the log data repository 152 for storage.

For example, the log data may include a count of success tokens generated by the updated application executed on the cluster 140A. As referred to herein, a "success token" may include data generated by the updated application in response to successfully executing a particular task that is indicative of the proper functioning of the update. For example, an e-commerce application can be configured to generate a success token every time an order is successfully placed by a customer, because the application being able to allow customers to successfully place orders is an indication that any updates applied thereto are functioning properly. As another example, an image resizing application can be configured to generate a success token every time a resized image is successfully returned to the requestor, because the application being able to generate and return resized images is an indication that any updates applied thereto are functioning properly. As another example, the log data may include transactions performed by the updated application executed on the cluster 140A. As another example, the log data may include health metrics indicating the health of the cluster 140A executing the updated application. Such health metrics may include one or more of latencies, number of errors, number of crashes, network bandwidth usage, memory usage, CPU usage, or disk usage. Additional details relating to health metrics are provided in U.S. application Ser. No. 14/673,429 (U.S. Pat. No. 9,842,017), titled "COLLECTION AND AGGREGATION OF DEVICE HEALTH METRICS," which is incorporated herein by reference in its entirety.

Cluster 140B (e.g., one of the clusters 140B) then retrieves the log data stored in the log data repository 152 and determines whether the log data satisfies a first condition for downloading the update onto the cluster 140B. If the cluster 140B determines that the first condition is satisfied, the cluster 140B downloads the update from the update repository 150 and updates the application executing on the cluster 140B (e.g., executing on the virtual machine of the cluster 140B). Alternatively, the cluster 140B may download the update onto the cluster 140B (e.g., onto local storage from which the update can be applied to the cluster 140B), and if the cluster 140B subsequently determines that the first condition is satisfied, the cluster 140B may update the application executing on the cluster 140B. For example, the download can occur as soon as the update is made available (or soon thereafter), but the update may not occur unless the condition for updating the application is satisfied. A similar modification can be made to other embodiments described herein. After the application running on the cluster 140B is updated, the cluster 140B outputs log data to the log data repository 152 for storage. Cluster 140C (e.g., one of the clusters 140C) then retrieves the log data stored in the log data repository 152 (e.g., log data generated by the updated application running on the cluster 140A and log data generated by the updated application running on the cluster 140B) and determines whether the log data satisfies a second condition for downloading the update onto the cluster 140C. The conditions described herein may serve as an indicator for whether or not the update is properly functioning and therefore can be installed. The conditions may indicate (i) a number or percentage of errors or successes that the clusters with updated software are encountering (e.g., objectively or compared to the software prior to the update), (ii) the performance (e.g., number of completed transactions, amount of resources used, etc.) of the updated software (e.g., objectively or compared to the software prior to the update), or (iii) the number of clusters that have updated their applications so far. In some embodiments, there are tiers of conditions. In FIGS. 2-4, the second condition may be more strict or conservative than the first condition. For example, satisfying the first condition may require a fewer number of clusters to have updated the application executing thereon than satisfying the second condition. As another example, satisfying the first condition may require a fewer number of success tokens to have been generated than satisfying the second condition. As yet another example, satisfying the second condition may require more closely mimicking the performance metrics of the pre-update software than satisfying the first condition. As yet another example, satisfying the second condition may require having a fewer number of errors than satisfying the first condition.

In the example of FIG. 3, the cloud provider network 120 includes the deployment service 130 that stores a software update (e.g., the data usable to update an application running on the clusters) onto the update repository 150. In response, cluster 140A (e.g., one of the clusters 140A) detects and downloads the software update. After the application running on the cluster 140A is updated, the cluster 140A outputs performance data to the other clusters in the cloud provider network 120 (e.g., clusters 140B, clusters 140C, and/or other ones of the clusters 140A). Alternatively, the cluster 140A may internally store the performance data and expose the stored performance data to the other clusters so that the other clusters can access the stored performance data. In some embodiments, the performance data may be identical to the log data described with reference to FIG. 2. In other embodiments, the log data includes information generated by the updated application, and the performance data includes information generated by the clusters (e.g., deployment manager 142). In yet other embodiments, the performance data includes information generated by the updated application, and the log data includes information generated by the clusters (e.g., deployment manager 142). Cluster 140B (e.g., one of the clusters 140B) may then process the performance data and determine whether the performance data satisfies a first condition for downloading the update onto the clusters 140B. If the cluster 140B determines that the first condition is satisfied, the cluster 140B downloads the update from the update repository 150 and updates the application executing on the cluster 140B. After the application running on the cluster 140B is updated, the cluster 140B outputs performance data to the other clusters in the cloud provider network 120 (e.g., clusters 140A, clusters 140C, and/or other ones of the clusters 140B). In some embodiments, if a cluster has already installed the update, the performance data may not be communicated to that cluster (e.g., clusters 140A).

Cluster 140C (e.g., one of the clusters 140C) may then process the performance data (e.g., performance data received from the cluster 140A and performance data received from the cluster 140B) and determine whether the performance data satisfies a second condition for downloading the update onto the cluster 140C. If the cluster 140C determines that the second condition is satisfied, the cluster 140C downloads the update from the update repository 150 and updates the application executing on the cluster 140C. After the application running on the cluster 140C is updated, the cluster 140C outputs performance data to the other clusters in the cloud provider network 120 (e.g., clusters 140A, clusters 140B, and/or the other ones of the cluster 140C). In some embodiments, the second condition is more strict or conservative than the first condition. For example, satisfying the first condition may require a fewer number of clusters to have updated the application executing thereon than satisfying the second condition. As another example, satisfying the first condition may require a fewer number of success tokens to have been generated than satisfying the second condition.

In the example of FIG. 4, the cloud provider network 120 includes the deployment service 130 that stores a software update (e.g., the data usable to update an application running on the clusters) onto a first repository 152. Additionally, the cloud provider network 120 includes a second repository 154 onto which the update is stored when the deployment service 130 determines that a first condition is satisfied, and a third repository 156 onto which the update is stored when the deployment service 130 determines that a second condition is satisfied. In the example of FIG. 4, upon the update being stored onto the respective repositories 152, 154, and 156, the clusters 140A, 140B, and 140C detect and download the update from the respective repositories 152, 154, and 156. The first and second conditions may be identical to those described above.

Although the examples illustrated in FIGS. 2-4 are sometimes described with reference to single clusters (e.g., cluster 140A, cluster 140B, and cluster 140C), in other embodiments, the same techniques are applied to some or all of the clusters 140A, clusters 140B, and clusters 140C, respectively. For example, some or all of the clusters 140A may download the software update in response to the software update being made available at the update repository 150, some or all of the clusters 140B may download and update the application executing thereon based on the first condition being satisfied, and some or all of the clusters 140C may download and update the application executing thereon based on the second condition being satisfied. As illustrated in FIGS. 2-4, by allowing the individual clusters to decide whether and when to deploy a software update that has been made available (e.g., by the deployment service 130), the cloud provider network 120 reduces the burden on the deployment service 130 and addresses the deficiencies described above with reference to prior deployment systems.

Example Routine for Cluster-Managed Deployment of Software Update

Figure 5:
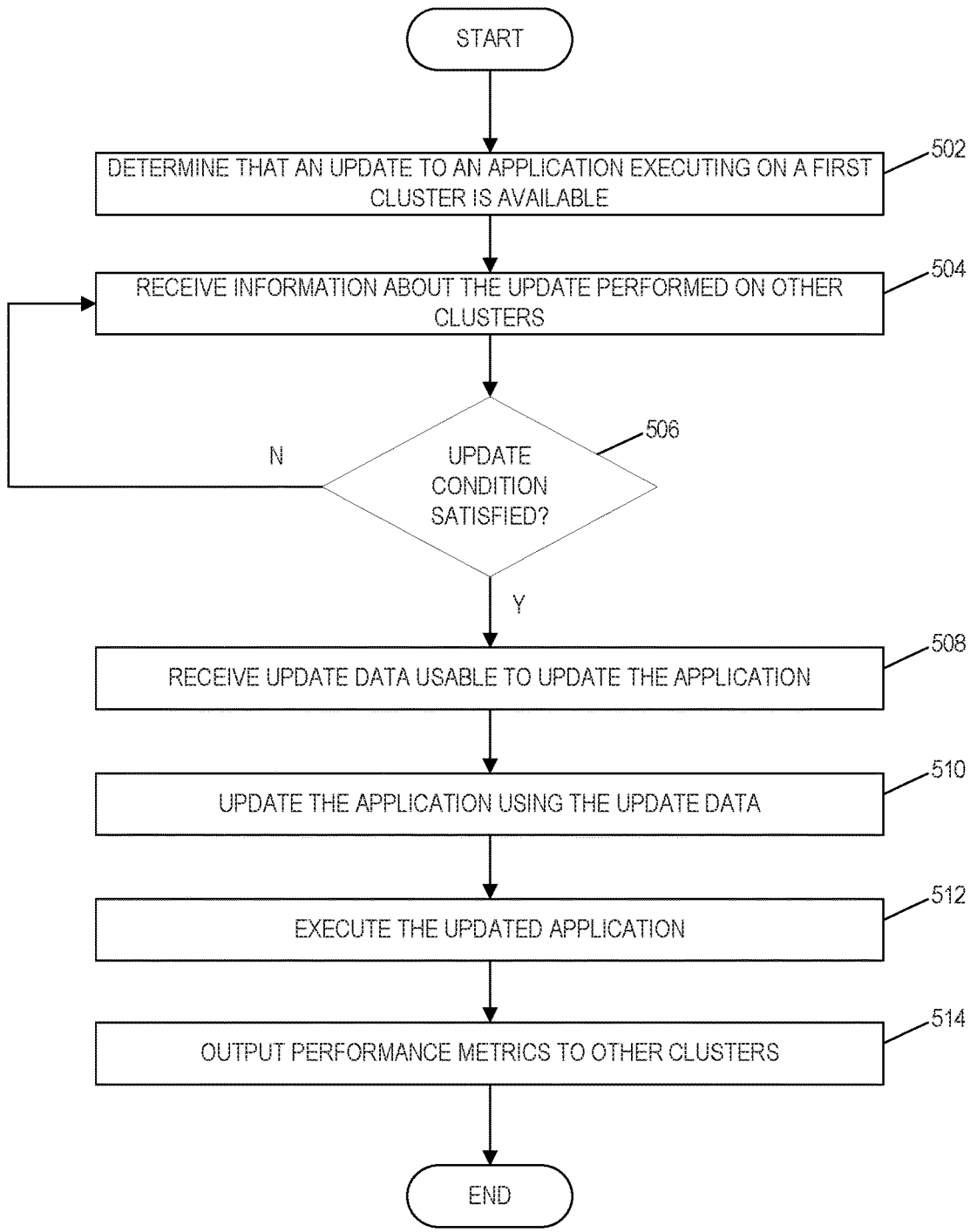
FIG. 5 is a flowchart of an example process for deploying a software update to multiple clusters in accordance with aspects of the present disclosure.

FIG. 5 depicts an illustrative routine 500 for deploying a software update in a decentralized manner in accordance with aspects of the present disclosure. The routine 500 may be carried out, for example, by the cluster 140 or one or more other components of the cloud provider network 120 described herein. For convenience, some or all of the steps of the routine 500 are described as being performed by the cluster 140 (e.g., one of the clusters 140-140N of FIG. 1). For example, the cluster 140 may include one or more hardware computing devices and non-transitory physical computer storage storing instructions that, when executed by the one or more hardware computing devices, cause the one or more hardware computing devices to perform the steps of the routine 500.

The routine 500 begins at 502, where the cluster 140 determines that an update to an application executing on the cluster 140 is available. For example, the cluster 140 may receive a notification from the deployment service 130 or from one or more other clusters within the cloud provider network that are executing the same application as the cluster 140.

At block 504, the cluster 140 receives information about the update performed on other clusters. For example, the received information may include a count of success tokens generated by the updated applications executed on other clusters. As another example, the received information may include transactions performed by the updated applications executed on other clusters. Such information may be received in the form of log data from a log database (e.g., log data repository 152). As another example, the received information may include health metrics indicating the health of the other clusters executing the updated application. Such health metrics may include one or more of latencies, number of errors, number of crashes, network bandwidth usage, memory usage, CPU usage, or disk usage.

At block 506, the cluster 140 determines whether an update condition for updating the application executing on the cluster 140 is satisfied. For example, the cluster 140 may determine whether the update condition is satisfied based on how many or what percentage of the other clusters have already applied the update to the application. In such an example, the cluster 140 may determine that the update condition is satisfied if at least 30% of the other clusters have already applied the update to the application. As another example, the cluster 140 may determine whether the update condition is satisfied based on the performance data generated by the other clusters or the applications executing thereon after the update has been applied. In such an example, the cluster 140 may determine that the update condition is satisfied if the updated applications executing on the other clusters have collectively generated more than 10,000 success tokens since the update was applied. In some cases, the cluster 140 may determine that the update condition is satisfied if the health metrics received from the other clusters satisfy a certain performance threshold (e.g., less than a threshold level of errors, crashes, latencies, resource usage, etc.).

If the cluster 140 determines that the update condition is not satisfied, the routine 500 returns to block 504 to receive additional information about the update performed on other clusters. Otherwise, the routine 500 proceeds to block 508.

At block 508, the cluster 140 receives update data usable to update the application executing on the cluster 140. For example, the cluster 140 may access the update data from an update repository (e.g., update repository 150) in networked communication with the cluster 140. As described herein, the deployment service 130 may store such update data onto the update repository at the request from the user computing device 102 or in response to receiving the update data from the user computing device 102.

At block 510, the cluster 140 updates the application using the update data. For example, the cluster 140 installs the update on each one of the virtual machines of the cluster 140 that are executing the application.

At block 512, the cluster 140 executes the updated application. For example, the cluster 140 executes the update replication on each one of the virtual machines of the cluster 140.

At block 514, the cluster 140 outputs performance metrics (e.g., generated by the updated application and/or indicating the performance of the updated application) to other clusters and/or the deployment service 130. For example, the performance metrics may include the ID of the version of the update deployed onto the cluster 140, the ID of the application to which the update was applied, resource usage, health metrics, success tokens, to name a few. Such performance metrics may be used by the other clusters in the cloud provider network 120 and/or the deployment service 130 to facilitate deployment of the software update onto additional clusters. Although the performance metrics are illustrated in FIG. 5 as being outputted at the end of the routine 500, in other embodiments, the performance metrics are continuously generated by the cluster 140 and/or the application executing thereon and stored in local or remote storage. As described herein, instead of outputting the generated performance metrics, the cluster 140 may expose the generated performance metrics to the other clusters executing the same application so that such clusters can access the performance metrics and decide whether to update their applications. The routine 500 may then end.

The method 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Deployment Service

Figure 6:
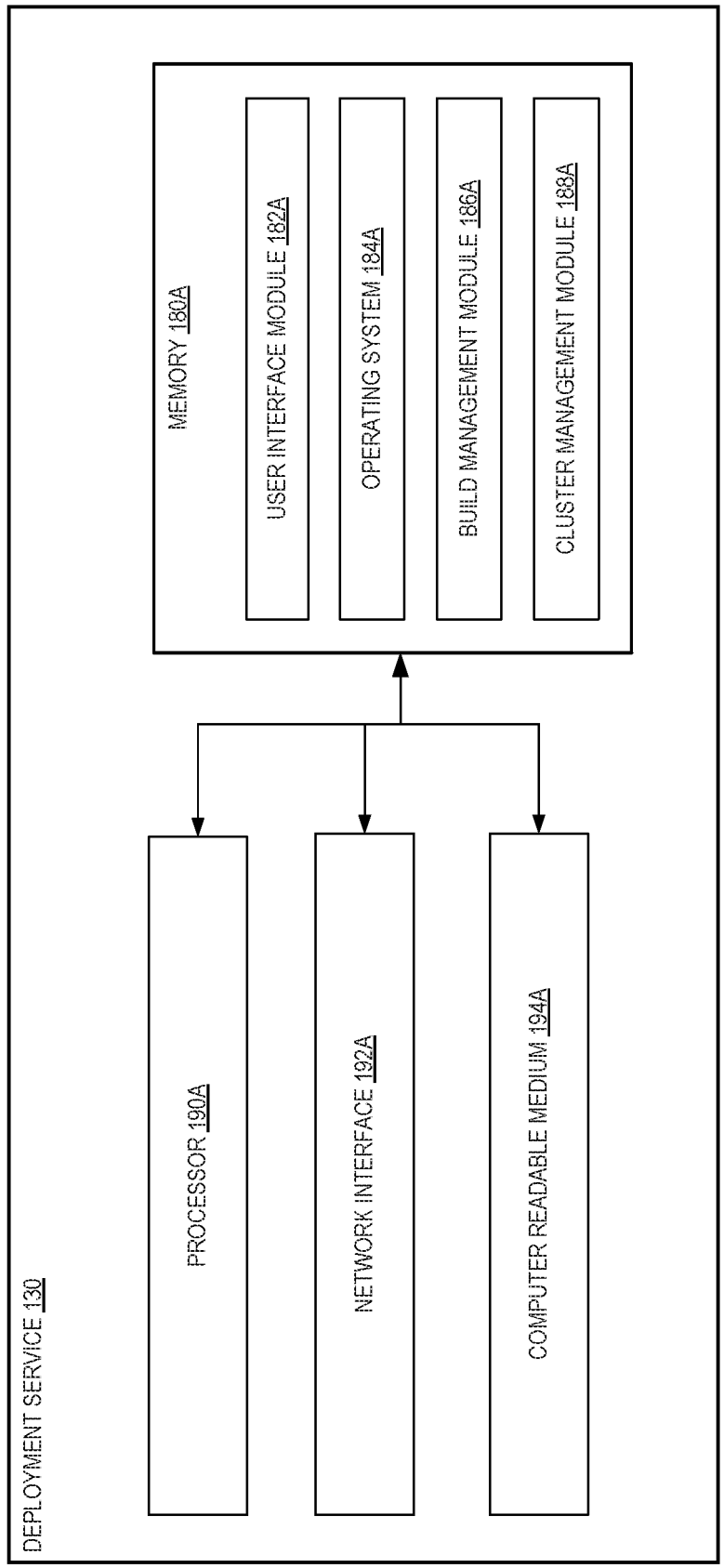
FIG. 6 depicts a general architecture of a computing device or system providing a deployment service in accordance with aspects of the present disclosure.

FIG. 6 depicts an example architecture of a computing system (referred to as the deployment service 130) that can be used to perform one or more of the techniques described herein or illustrated in FIGS. 1-5. The general architecture of the deployment service 130 depicted in FIG. 6 includes an arrangement of computer hardware and software modules that may be used to implement one or more aspects of the present disclosure. The deployment service 130 may include many more (or fewer) elements than those shown in FIG. 6. It is not necessary, however, that all of these elements be shown in order to provide an enabling disclosure. As illustrated, the deployment service 130 includes a processor 190A, a network interface 192A, and a computer readable medium 194A, all of which may communicate with one another by way of a communication bus. The network interface 192A may provide connectivity to one or more networks or computing systems. The processor 190A may thus receive information and instructions from other computing systems or services via the network 104 illustrated in FIG. 1.

The processor 190A may also communicate with memory 180A. The memory 180A may contain computer program instructions (grouped as modules in some embodiments) that the processor 190A executes in order to implement one or more aspects of the present disclosure. The memory 180A may include RAM, ROM, and/or other persistent, auxiliary, or non-transitory computer-readable media. The memory 180A may store an operating system 184A that provides computer program instructions for use by the processor 190A in the general administration and operation of the deployment service 130. The memory 180A may further include computer program instructions and other information for implementing one or more aspects of the present disclosure. For example, in one embodiment, the memory 180A includes a user interface module 182A that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180A may include or communicate with one or more data stores.

In addition to and/or in combination with the user interface module 182A, the memory 180A may include a build management module 186A and a cluster management module 188A that may be executed by the processor 190A. In one embodiment, the build management module 186A and the cluster management module 188A implements various aspects of the present disclosure, e.g., building and/or testing a software update, storing the software update for download by the clusters 140, analyze performance data generated by the clusters 140, determine whether conditions for deploying the software update to additional clusters are satisfied, and/or other aspects discussed herein or illustrated in FIGS. 1-5.

While the build management module 186A and the cluster management module 188A are shown in FIG. 6 as part of the deployment service 130, in other embodiments, all or a portion of the build management module 186A and/or the cluster management module 188A may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the deployment service 130. It will also be appreciated that, in some embodiments, a user computing device (e.g., the user computing device 102 of FIG. 1) may implement functionality that is otherwise described herein as being implemented by the elements and/or modules of the deployment service 130. For example, the user computing device 102 may receive code modules or other instructions from the deployment service 130 and/or other components of the cloud provider network 120 via the network 104 that are executed by the user computing device 102 to implement various aspects of the present disclosure.

Example Architecture of Cluster

Figure 7:
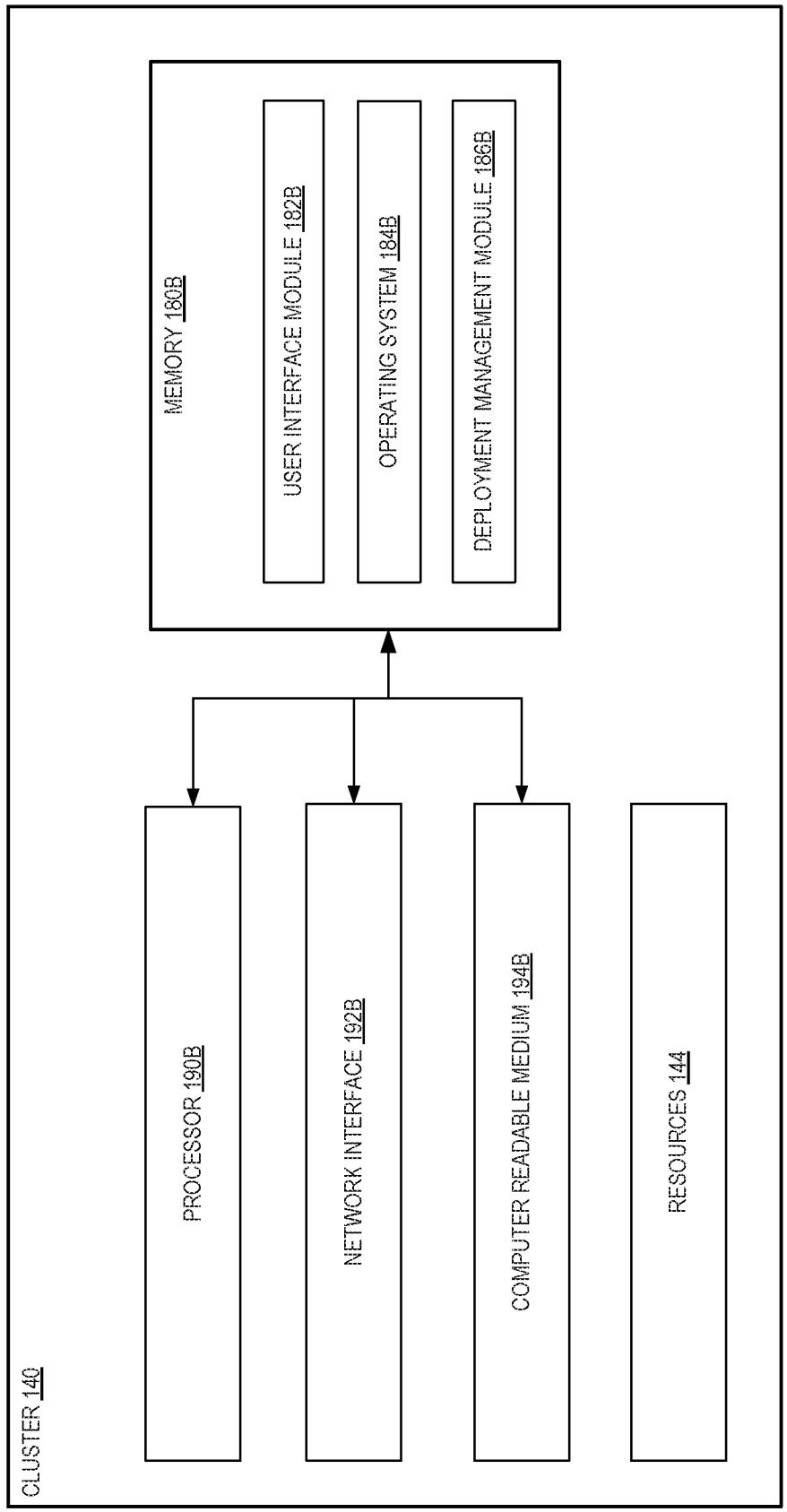
FIG. 7 depicts a general architecture of a computing device or system providing a cluster in accordance with aspects of the present disclosure.

FIG. 7 depicts an example architecture of a computing system (referred to as the cluster 140) that can be used to perform one or more of the techniques described herein or illustrated in FIGS. 1-5. The general architecture of the cluster 140 depicted in FIG. 7 includes an arrangement of computer hardware and software modules that may be used to implement one or more aspects of the present disclosure. The other clusters shown in FIG. 1 may be implemented in a similar manner. The cluster 140 may include many more (or fewer) elements than those shown in FIG. 7. It is not necessary, however, that all of these elements be shown in order to provide an enabling disclosure. As illustrated, the cluster 140 includes a processor 190B, a network interface 192B, and a computer readable medium 194B, all of which may communicate with one another by way of a communication bus. The network interface 192B may provide connectivity to one or more networks or computing systems. The processor 190B may thus receive information and instructions from other computing systems or services via the network 104 illustrated in FIG. 1.

The processor 190B may also communicate with memory 180B. The memory 180B may contain computer program instructions (grouped as modules in some embodiments) that the processor 190B executes in order to implement one or more aspects of the present disclosure. The memory 180B may include RAM, ROM, and/or other persistent, auxiliary, or non-transitory computer-readable media. The memory 180B may store an operating system 184B that provides computer program instructions for use by the processor 190B in the general administration and operation of the cluster 140. The memory 180B may further include computer program instructions and other information for implementing one or more aspects of the present disclosure. For example, in one embodiment, the memory 180B includes a user interface module 182B that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180B may include or communicate with one or more data stores.

In addition to and/or in combination with the user interface module 182B, the memory 180B may include a deployment management module 186B that may be executed by the processor 190B. In one embodiment, the deployment management module 186B implements various aspects of the present disclosure, e.g., determining that a software update is available, determining whether and when to deploy the software update, downloading the software update, applying the software update, executing the updated application, reporting performance data to other components of the cloud network provider, and/or other aspects discussed herein or illustrated in FIGS. 1-5.

Additionally, the cluster 140 includes the resources 144. As described herein, the resources 144 may include one or more of virtual machines, containers, or nodes hosted on one or more physical host machines. For example, the resources 144 may be provided by the same physical host machine providing the other components shown in FIG. 7 and/or may be provided by another physical host machine different from the physical host machine providing the other components shown in FIG. 7.

While the deployment management module 186B is shown in FIG. 7 as part of the cluster 140, in other embodiments, all or a portion of the deployment management module 186B may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the cluster 140. It will also be appreciated that, in some embodiments, a user computing device (e.g., the user computing device 102 of FIG. 1) may implement functionality that is otherwise described herein as being implemented by the elements and/or modules of the cluster 140. For example, the user computing device 102 may receive code modules or other instructions from the cluster 140 and/or other components of the cloud provider network 120 via the network 104 that are executed by the user computing device 102 to implement various aspects of the present disclosure.

Other Considerations

Although some embodiments of the present disclosure focus on software updates, in other embodiments, the techniques described herein may be applied to rollbacks (e.g., undoing a software update, or installing a prior version of software). For example, a cluster may revert back to a previous version of the software based on the number or percentage of clusters that have reverted back to the previous version and/or based on the number of successes/errors encountered by those clusters that have reverted back to the previous version. In such cases, the cluster may also determine whether to revert back to the previous version based on the data previously determined or collected by the cluster about the previous version. For example, if the cluster previously generated a high trust score for the previous version, the cluster may revert back to the previous version more quickly (e.g., without waiting for information from the other clusters or without having to wait for a high trust score to be built up for the previous version based on the information from the other clusters).

TERMINOLOGY

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
    a set of clusters hosted on a plurality of physical host machines, wherein each cluster in the set includes a virtual machine configured to perform tasks on behalf of a user of the cluster;
    an update repository configured to at least store software update data usable to update an application executing on the virtual machines of the set of clusters; and
    a deployment service comprising computer hardware, wherein the deployment service is configured to at least:
        perform testing on first update data usable to update a first application executing on the virtual machines of the set of clusters;
        determine that a result of the testing satisfies a condition for storing the first update data onto the update repository for download by a cluster of the set of clusters; and
        store the first update data onto the update repository,
    wherein the set of clusters includes a first cluster of virtual machines, wherein the virtual machines of the first cluster are each configured to at least execute a first copy of the first application, the first cluster further configured to at least:
        access the first update data from the update repository;
        update first copies of the first application executed on the first cluster using the first update data to generate first copies of a first updated application; and
        execute the first copies of the first updated application on the first cluster,
    wherein the set of clusters further includes a second cluster of virtual machines, wherein the virtual machines of the second cluster are each configured to at least execute a second copy of the first application, the second cluster being different from the first cluster and further configured to at least:
        receive information associated with the first copies of the first updated application executed on the first cluster, wherein the information includes at least performance data associated with the first copies of the first updated application executed on the first cluster;
        determine, based at least on the performance data associated with the first copies of the first updated application, that a condition for updating second copies of the first application executed on the second cluster is satisfied;
        access the first update data from the update repository;
        update the second copies of the first application executed on the second cluster using the first update data to generate second copies of the first updated application; and
        execute the second copies of the first updated application on the second cluster.

2. The cloud provider system of claim 1, wherein the second cluster is further configured to at least determine that the condition is satisfied based at least on a number or percentage of clusters in the set executing copies of the first updated application.

3. The cloud provider system of claim 1, wherein the second cluster is further configured to receive the information from the first cluster.

4. The cloud provider system of claim 3, wherein the information received from the first cluster indicates a count of success tokens generated by the first copies of the first updated application executed on the first cluster.

5. A computer-implemented method, comprising:
   determining, by a first cluster of compute resources in a set of clusters of compute resources, that an update to a copy of a first application executing on the first cluster of compute resources is available;
   receiving, by the first cluster, information associated with a first updated copy of the first application executed on an additional cluster of compute resources in the set, wherein the information includes at least performance data associated with the first updated copy of the first application executed on the additional cluster;
   based at least on the performance data associated with the first updated copy of the first application, determining, by the first cluster, that a first condition for updating the copy of the first application executing on the first cluster of compute resources is satisfied;
   updating, by the first cluster, the copy of the first application executing on the first cluster of compute resources to generate a second updated copy of the first application; and
   executing, by the first cluster, the second updated copy of the first application on the first cluster of compute resources.

6. The computer-implemented method of claim 5, wherein the information received by the first cluster indicates a count of success tokens generated by the first updated copy of the first application executed on the additional cluster of compute resources.

7. The computer-implemented method of claim 5, wherein the information received by the first cluster indicates a transaction performed by the first updated copy of the first application executed on the additional cluster of compute resources.

8. The computer-implemented method of claim 5, wherein the information received by the first cluster indicates one or more of a latency, number of errors, number of crashes, network bandwidth usage, memory usage, CPU usage, or disk usage.

9. The computer-implemented method of claim 5, wherein the first cluster of compute resources includes one or more of virtual machines, containers, or nodes hosted on a set of physical host machines.

10. The computer-implemented method of claim 5, further comprising outputting, by the first cluster, information associated with the execution of the second updated copy of the first application on the first cluster of compute resources to a second cluster in the set of clusters of compute resources that has not yet updated a copy of the first application executing on the second cluster of compute resources.

11. The computer-implemented method of claim 10, wherein satisfying the first condition requires a fewer number of clusters to have updated copies of the first application executing thereon than satisfying a second condition for updating the copy of the first application executing on the second cluster of compute resources.

12. The computer-implemented method of claim 10, wherein satisfying the first condition requires a fewer number of success tokens to have been generated than satisfying a second condition for updating the copy of the first application executing on the second cluster of compute resources.

13. A non-transitory computer-readable medium storing instructions that, when executed by a computing system, cause the computing system to perform operations comprising:
   determining, by a first cluster of compute resources in a set of clusters of compute resources, that an update to a copy of a first application executing on the first cluster of compute resources is available;
   receiving, by the first cluster, information associated with a first updated copy of the first application executed on an additional cluster of compute resources in the set, wherein the information includes at least performance data associated with the first updated copy of the first application executed on the additional cluster;
   based at least on the performance data associated with the first updated copy of the first application, determining, by the first cluster, that a first condition for updating the copy of the first application executing on the first cluster of compute resources is satisfied;
   updating, by the first cluster, the copy of the first application executing on the first cluster of compute resources to generate a second updated copy of the first application; and
   executing, by the first cluster, the second updated copy of the first application on the first cluster of compute resources.

14. The non-transitory computer-readable medium of claim 13, wherein the information received by the first cluster indicates a count of success tokens generated by the first updated copy of the first application executed on the additional cluster of compute resources.

15. The non-transitory computer-readable medium of claim 13, wherein the information received by the first cluster indicates a transaction performed by the first updated copy of the first application executed on the additional cluster of compute resources.

16. The non-transitory computer-readable medium of claim 13, wherein the information received by the first cluster indicates one or more of a latency, number of errors, number of crashes, network bandwidth usage, memory usage, CPU usage, or disk usage.

17. The non-transitory computer-readable medium of claim 13, wherein the first cluster of compute resources includes one or more of virtual machines, containers, or nodes hosted on a set of physical host machines.

18. The non-transitory computer-readable medium of claim 13, wherein the operations further comprise outputting, by the first cluster, information associated with the execution of the second updated copy of the first application on the first cluster of compute resources to a second cluster in the set of clusters of compute resources that has not yet updated a copy of the first application executing on the second cluster of compute resources.

19. The non-transitory computer-readable medium of claim 18, wherein satisfying the first condition requires a fewer number of clusters to have updated copies of the first application executing thereon than satisfying a second condition for updating the copy of the first application executing on the second cluster of compute resources.

20. The non-transitory computer-readable medium of claim 18, wherein satisfying the first condition requires a fewer number of success tokens to have been generated than satisfying a second condition for updating the copy of the first application executing on the second cluster of compute resources.

* * * * *